P. FILLIEZ.
GRIP.
APPLICATION FILED MAR. 26, 1912.
1,069,935.
Patented Aug. 12, 1913.
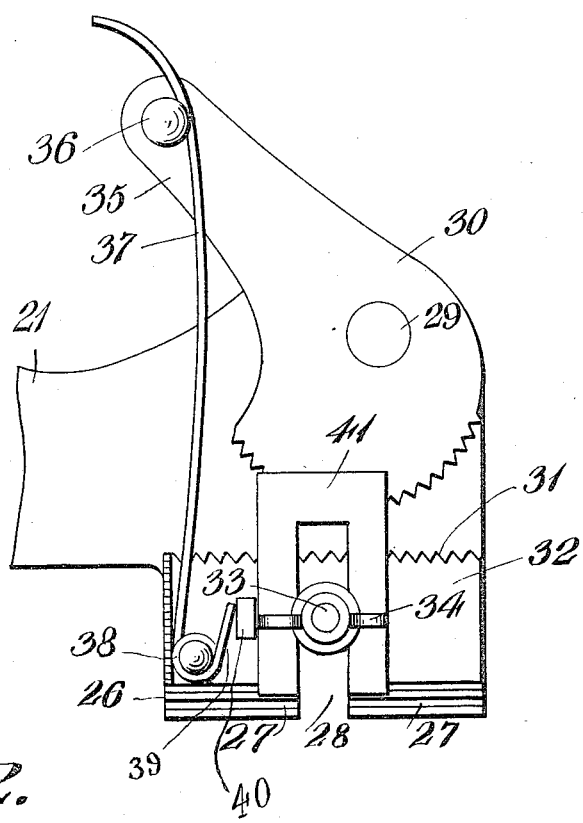
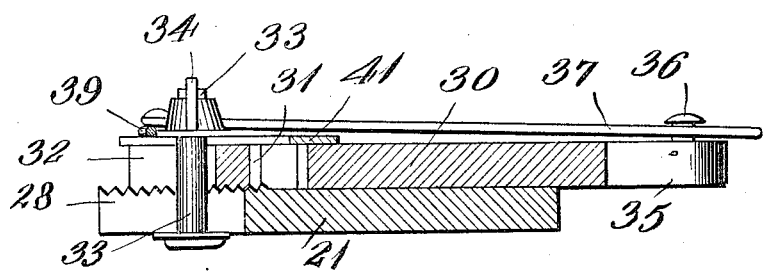

UNITED STATES PATENT OFFICE.

PETER FILLIEZ, OF CANTON, OHIO.

GRIP.

1,069,935. Specification of Letters Patent. Patented Aug. 12, 1913.

Original application filed November 3, 1911, Serial No. 658,410. Divided and this application filed March 26, 1912. Serial No. 686,296.

*To all whom it may concern:*

Be it known that I, PETER FILLIEZ, a citizen of the United States, residing at Canton, in the county of Stark and State of Ohio, have invented new and useful Improvements in Grips, of which the following is a specification.

This invention relates to devices for gripping apparatus, and particularly to wire grippers suitable for use with wire stretchers, and designed particularly for use with the device illustrated in my copending application filed November 3, 1911, Serial No. 658,410, of which this case is a division, although its use is not limited to such machines.

It has for its object to provide a grip of simple construction whereby the cost of manufacture will be minimized, and also has as important objects the provision of a simple adjustment for accommodating strands of various diameters; an actuating spring serving as a retainer for strands and a positive retaining means adapted to be secured commonly with the adjustable grip element.

Other objects and advantages will be apparent from the following description, and from the drawings, in which.

Figure 1 is a plan view of the device, Fig. 2 is a cross section thereof.

There is illustrated a base element 21, which may comprise a portion of any stationary or movable element to hold or move the device against the tension of a strand or other article engaged therewith. It is provided with a jaw 26 extending laterally therefrom and serrated as at 27 on its upper side forming transverse parallel ribs and grooves. This jaw has a medial slot 28 transverse to the serrations 27 and opening on the upper and lower faces of the jaw and on its outer edge. Spaced from the jaw on the upper side of the base 21 there is a pivot pin 29 pivoted upon which there is a cam dog 30 having an eccentric serrated periphery arranged to bear under rotation against or toward the roughened adjacent face 31 of an adjustable block 32 serrated on its under side to fit snugly upon the serrations of the jaw 26. This block has also a bolt 33 therethrough disposed slidably in the slot 28 and engaged with a wing nut 34, whereby the block is securely held in position when adjusted on the jaw in proper relation to the dog to coengage therewith upon an interposed wire of any thickness. The dog is provided with an arm 35, extending laterally from the shank and having a headed pin 36 on its upper side adjacent its extremity borne upon by the arm 37 of a wire spring having a helix 38 set upon a suitable pin carried by the block 32, the opposite end of the wire being extended to form an arm 39 engaged against a lug 40 on the block whereby the arm 37 is caused to exert proper force upon the dog to cause it to engage properly upon the wire in the device. It will be seen that the end of the arm 37 projects somewhat beyond the pin 36 whereby it may be disengaged therefrom and thus is adapted to serve as a retainer for wire engaged in the grips, preventing escape of the wire therefrom, its release being effected by lifting the arm manually out from under the head of the pin, when it will move from over the wire, allowing its ready displacement from between the dog and block. The wire spring may of course be secured suitably against casual disengagement from the block under pressure of a wire being stretched.

For the secure retention of very heavy wire, or where the arm 37 is likely to be too weak or light, I provide the retaining plate 41 longitudinally slotted and held adjustably upon the block by the bolt 33. The slot in the plate allows it to be projected across the space between the block and dog or withdrawn, as desired. This space may be called the throat.

In use, the spring and plate are moved from over the throat, and the wire or other article to be held may be engaged between the dogs and blocks, after which the block 32 is adjusted in proper spaced relation to the dog and if desired, the plate 41 projected over the throat when the plate and block are clamped in place by the wing nut and the spring is returned to engagement with the dog.

The adjustable feature of the grips is especially advantageous in permitting the stretching of heavy trolley wires or the lightest telephone wires with the same implement. It is adapted to allow free movement of the object to be gripped, in one direction, whereby it is especially adapted to use upon a wire stretcher including two oppositely reciprocating members, each of which is provided with one of my grips, whereby both may be engaged with one wire to draw thereupon at each reciprocation.

What is claimed is:

In a device of the class described, a body member carrying a friction block, a cam dog pivoted on the body to bear against the block, a spring element secured upon the block, and having an arm projected across the space between the block and dog for retention of a wire and engaged detachably with the dog for operation of the dog, whereby the arm may be displaced for release or engagement of a wire.

In testimony whereof I have hereunto set my hand in presence of two subscribing witnesses.

PETER FILLIEZ.

Witnesses:
 JOHN McCORTON,
 GUS. MENEGAY.

---

Copies of this patent may be obtained for five cents each, by addressing the "Commissioner of Patents, Washington, D. C."